(12) United States Patent
Onishi

(10) Patent No.: US 8,063,780 B2
(45) Date of Patent: Nov. 22, 2011

(54) MONITOR AREA SETTING DEVICE FOR OPTICAL SCANNING UNIT

(75) Inventor: Tomohiro Onishi, Osaka (JP)

(73) Assignee: Keyence Corporation, Osaka (JP)

( * ) Notice: Subject to any disclaimer, the term of this patent is extended or adjusted under 35 U.S.C. 154(b) by 413 days.

(21) Appl. No.: 12/427,104

(22) Filed: Apr. 21, 2009

(65) Prior Publication Data

US 2009/0289791 A1 Nov. 26, 2009

(30) Foreign Application Priority Data

May 20, 2008 (JP) ................................. 2008-132468

(51) Int. Cl.
*G08B 21/00* (2006.01)

(52) U.S. Cl. .......................... 340/557; 340/556; 250/221

(58) Field of Classification Search .......... 340/552–557, 340/679, 686.1; 250/221, 221.1; 361/1
See application file for complete search history.

(56) References Cited

U.S. PATENT DOCUMENTS

| | | |
|---|---|---|
| 4,464,014 A | 8/1984 | Sick et al. |
| 4,662,707 A | 5/1987 | Teach et al. |
| 4,668,859 A | 5/1987 | Winterer |
| 4,738,529 A | 4/1988 | Hug |
| 4,830,489 A | 5/1989 | Cain et al. |
| 5,137,354 A | 8/1992 | deVos et al. |
| 5,180,922 A | 1/1993 | Hug |
| 5,455,669 A | 10/1995 | Wetteborn |
| 5,539,199 A | 7/1996 | Ruckh et al. |
| 5,635,905 A | 6/1997 | Blackburn et al. |
| 6,166,371 A | 12/2000 | Milbrath et al. |
| 2004/0189468 A1 | 9/2004 | Brunner |
| 2008/0296474 A1 | 12/2008 | Yamaguchi |
| 2009/0283666 A1 | 11/2009 | Tagashira |
| 2009/0287453 A1 | 11/2009 | Oh |
| 2009/0295577 A1 | 12/2009 | Yamaguchi |
| 2009/0295580 A1 | 12/2009 | Inoue et al. |
| 2010/0193668 A1 | 8/2010 | Kawabata |
| 2010/0194583 A1 | 8/2010 | Kawabata |

(Continued)

FOREIGN PATENT DOCUMENTS

DE 3606594 A1 9/1987

(Continued)

OTHER PUBLICATIONS

Kumekawa et al., "'Safety confirmation-type' measures for AGV collision prevention," Proceedings of the 5th International Conference Automated Guided Vehicle Systems, Oct. 1987, pp. 207-218 (13 pages).

(Continued)

*Primary Examiner* — Jeffery Hofsass
(74) *Attorney, Agent, or Firm* — Kilyk & Bowersox, P.L.L.C.

(57) ABSTRACT

This invention provides a monitor area setting device with which an area can be easily added to or deleted from a monitor area. The device includes: an area addition/deletion specifying unit that specifies an addition area and a deletion area based on an input signal from an operating unit; an inconsistent area extraction unit that extracts an area that is between the safety area and the addition area with respect to the safety sensor as an inconsistent area; and an area setting update unit that updates area setting information so as to set an area formed either by adding the addition area and the inconsistent area to the safety area or by excluding the deletion area and the inconsistent area from the safety area as a new monitor area.

16 Claims, 13 Drawing Sheets

U.S. PATENT DOCUMENTS

2010/0198365 A1    8/2010    Kawabata et al.

FOREIGN PATENT DOCUMENTS

| | | |
|---|---|---|
| DE | 3735905 A1 | 5/1989 |
| JP | H1-158376 | 6/1989 |
| JP | H036408 | 1/1991 |
| JP | 03-175390 | 7/1991 |
| JP | 04-310890 | 11/1992 |
| JP | H04310890 | 11/1992 |
| JP | 2008-298646 | 12/2008 |
| WO | 9205455 A1 | 4/1992 |

OTHER PUBLICATIONS

Nishide et al., "Automatic Position Findings of Vehicle by Means of Laser," Proceedings 1986 IEEE International Conference on Robotics and Automation, Apr. 1986, pp. 1343-1348 (7 pages).

MONITOR AREA SETTING DEVICE FOR OPTICAL SCANNING UNIT

CROSS-REFERENCE TO RELATED APPLICATIONS

The present application claims foreign priority based on Japanese Patent Application No. 2008-132468, filed May 20, 2008, the contents of which is incorporated herein by reference.

BACKGROUND OF THE INVENTION

1. Field of the Invention

The present invention relates to a monitor area setting device, and in particular, to an improvement of a monitor area setting device that generates area setting information for designating a monitor area to an area monitoring sensor that emits detection light in different directions and senses an intruder within the previously set monitor area based on reflection of the detection light.

2. Description of the Related Art

Area monitoring sensors have been known as a sensor that senses an intruder such as a person entered into a no entrance area and outputs a detection signal. A typical area monitoring sensor is provided with, for example, a light projecting unit that projects detection light, a scanning unit that scans the detection light, and a light receiving unit that receives the detection light reflected on the intruder, and a distance and a direction toward the intruder are sensed based on an output from the light receiving unit. Then, based on a result of the sensing, it is determined whether or not the intruder is present within a predetermined area, and the detection signal is outputted based on a result of the determination. This detection signal is used, for example, as a control signal that stops a machine tool working near the monitored area.

Typically, an area setting tool is used in order to specify an area for sensing as a monitor area to such an area monitoring sensor, or in order to edit the monitor area that has been set. The area setting tool is an application program that runs on an information processing unit such as a personal computer, and can set a monitor area according to how factory equipment such as machine tools are placed.

In the case of a conventional area setting tool, however, the monitor area is set by an area that is enclosed by lines or arcs connecting vertices. Accordingly, it is not easy to add or delete a user specified area to or from the monitor area after setting a predetermined area as the monitor area. In particular, it is in fact difficult to add an area that is distant from the monitor area that has already been set, or delete an area that is within the monitor area but distant from a periphery portion of the monitor area.

In addition, the area monitoring sensor as described above, by its nature, cannot set an area that is positioned, with respect to the sensor, on a forward side of the area for sensing as a non-sensing area, or cannot set an area that is positioned, with respect to the sensor, on a backward side of the non-sensing area as an area for sensing. As a result, when editing the monitor area with the conventional area setting tool, it is adversely required to consider such characteristics of the area monitoring sensor when adding or deleting an area, which results in poor operability.

SUMMARY OF THE INVENTION

In view of the above problems, an object of the present invention is to provide a monitor area setting device with improved operability when editing a monitor area containing an area for sensing an intruder. In particular, the present invention aims to provide an area setting device capable of easily adding or deleting a user specified area to or from the monitor area.

A monitor area setting device according to a first aspect of the present invention generates area setting information for designating a monitor area to an area monitoring sensor that emits detection light in different emitting directions and senses an intruder within the monitor area based on reflection of the detection light, and the device includes: an area setting recording unit that holds the area setting information; an addition area specifying unit that specifies an addition area based on an operation input; an inconsistent area extracting unit that extracts an area that is between the monitor area and the addition area with respect to the area monitoring sensor as an inconsistent area; and an area setting updating unit that updates the area setting information so as to set an area formed by adding the addition area and the inconsistent area to the monitor area as a new monitor area.

With this monitor area setting device, the area between the monitor area and the addition area with respect to the area monitoring sensor is automatically extracted as the inconsistent area, and the area setting information is updated to set the area formed by adding the addition area and the inconsistent area to the monitor area as the new monitor area. According to such a configuration, the area setting information is updated by automatically extracting the inconsistent area where the inconsistency occurs when the user specifies the addition area, and therefore it is possible to easily add the desired area to the safety area without full knowledge of the area monitoring sensor. In particular, it is possible to easily add an area that is present at a distant location from the monitor area that has already been set.

A monitor area setting device according to a second aspect of the present invention generates area setting information for designating a monitor area to an area monitoring sensor that emits detection light in different emitting directions and senses an intruder within the monitor area based on reflection of the detection light, and the device includes: an area setting recording unit that holds the area setting information; a line specifying unit that specifies a line based on an operation input; an inconsistent area extracting unit that extracts an area that is between the monitor area and the line with respect to the area monitoring sensor as an inconsistent area; and an area setting updating unit that updates the area setting information so as to set an area formed by adding the inconsistent area to the monitor area as a new monitor area.

With this monitor area setting device, the area between the monitor area and the line with respect to the area monitoring sensor is automatically extracted as the inconsistent area, and the area setting information is updated to set the area formed by adding the inconsistent area to the monitor area as the new monitor area. According to such a configuration, the area setting information is updated by automatically extracting the inconsistent area where the inconsistency occurs when the user specifies the line, and therefore it is possible to easily add the desired area to the safety area without full knowledge of the area monitoring sensor. In particular, it is possible to easily add an area that is formed by the line present at a distant location from the monitor area that has already been set.

In addition to the above configuration, the monitor area setting device according to a third aspect of the present invention further includes: an inconsistent area display unit that displays the inconsistent area; and a dialogue display unit that displays an inquiry dialogue for inquiring whether or not the inconsistent area is to be added to the monitor area, wherein the area setting updating unit updates the area setting information based on an operation input after the inquiry dialogue is displayed. According to such a configuration, the area for sensing that newly occurs by setting the addition area or the line as the area for sensing is extracted and displayed as the inconsistent area, it is possible to easily identify the position of the inconsistent area with respect to the monitor area. Further, as the area setting information is updated based on the operation input after the inquiry dialogue is displayed, it is possible to improve the convenience when editing the monitor area.

A monitor area setting device according to a fourth aspect of the present invention generates area setting information for designating a monitor area to an area monitoring sensor that emits detection light in different emitting directions and senses an intruder within the monitor area based on reflection of the detection light, and the device includes: an area setting recording unit that holds the area setting information; a deletion area specifying unit that specifies a deletion area based on an operation input; an inconsistent area extracting unit that extracts an area that is within the monitor area and on a backward side of the deletion area; and an area setting updating unit that updates the area setting information so as to set an area formed by excluding the deletion area and the inconsistent area from the monitor area as a new monitor area.

With this monitor area setting device, the area that is on the backward side of the area to be deleted with respect to the area monitoring sensor is automatically extracted as the inconsistent area, and the area setting information is updated to set the area formed by excluding the area to be deleted and the inconsistent area from the monitor area as a new monitor area. According to such a configuration, the area setting information is updated by automatically extracting the inconsistent area where the inconsistency occurs when the user specifies the area to be deleted, and therefore it is possible to easily delete the desired area from the safety area without full knowledge of the area monitoring sensor. In particular, it is possible to easily delete an area that is present within the monitor area and at a distant location from a periphery portion.

A monitor area setting device according to a fifth aspect of the present invention generates area setting information for designating a monitor area to an area monitoring sensor that emits detection light in different emitting directions and senses an intruder within the monitor area based on reflection of the detection light, and the device includes: an area setting recording unit that holds the area setting information; a line specifying unit that specifies a line based on an operation input; an inconsistent area extracting unit that extracts an area that is within the monitor area and on a backward side of the line; and an area setting updating unit that updates the area setting information so as to set an area formed by excluding the inconsistent area from the monitor area as a new monitor area.

With this monitor area setting device, the area that is on the backward side of the line with respect to the area monitoring sensor is automatically extracted as the inconsistent area, and the area setting information is updated to set the area formed by excluding the inconsistent area from the monitor area as a new monitor area. According to such a configuration, the area setting information is updated by automatically extracting the inconsistent area where the inconsistency occurs when the user specifies the line, and therefore it is possible to easily delete the desired area from the safety area without full knowledge of the area monitoring sensor. In particular, it is possible to easily delete an area formed by the line that is present within the monitor area and at a distant location from the periphery portion.

In addition to the above configuration, the monitor area setting device according to a sixth aspect of the present invention further includes: an inconsistent area display unit that displays the inconsistent area; and a dialogue display unit that displays an inquiry dialogue for inquiring whether or not the inconsistent area is to be removed from the monitor area, wherein the area setting updating unit updates the area setting information based on an operation input after the inquiry dialogue is displayed. According to such a configuration, the non-sensing area that newly occurs by setting the area to be deleted or the line as the non-sensing area is extracted and displayed as the inconsistent area, it is possible to easily identify the position of the inconsistent area with respect to the monitor area. Further, as the area setting information is updated based on the operation input after the inquiry dialogue is displayed, it is possible to improve the convenience when editing the monitor area.

According to the monitor area setting device of the present invention, the area setting information is updated by automatically extracting the inconsistent area where the inconsistency occurs when the user specifies the addition area or the line, and therefore it is possible to easily add the desired area to the safety area without full knowledge of the area monitoring sensor. In particular, it is possible to easily add an area that is present at a distant location from the monitor area that has already been set. Further, the area setting information is updated by automatically extracting the inconsistent area where the inconsistency occurs when the user specifies the area to be deleted or the line, and therefore it is possible to easily delete the desired area from the safety area without full knowledge of the area monitoring sensor. In particular, it is possible to easily delete an area that is present within the monitor area and at a distant location from the periphery portion. Thus, it is possible to improve operability when editing the monitor area that includes the area for sensing the intruder.

DETAILED DESCRIPTION OF THE PREFERRED EMBODIMENTS

First Embodiment

Hereinafter, a sensing system on which a monitor area setting device according to a first embodiment of the present invention is based is first described with reference to FIG. 1. The monitor area setting device according to the present embodiment is used to designate an area for sensing as a monitor area to an area monitoring sensor in the sensing system, or to edit a monitor area that has already been set.

Sensing System

Figure 1:
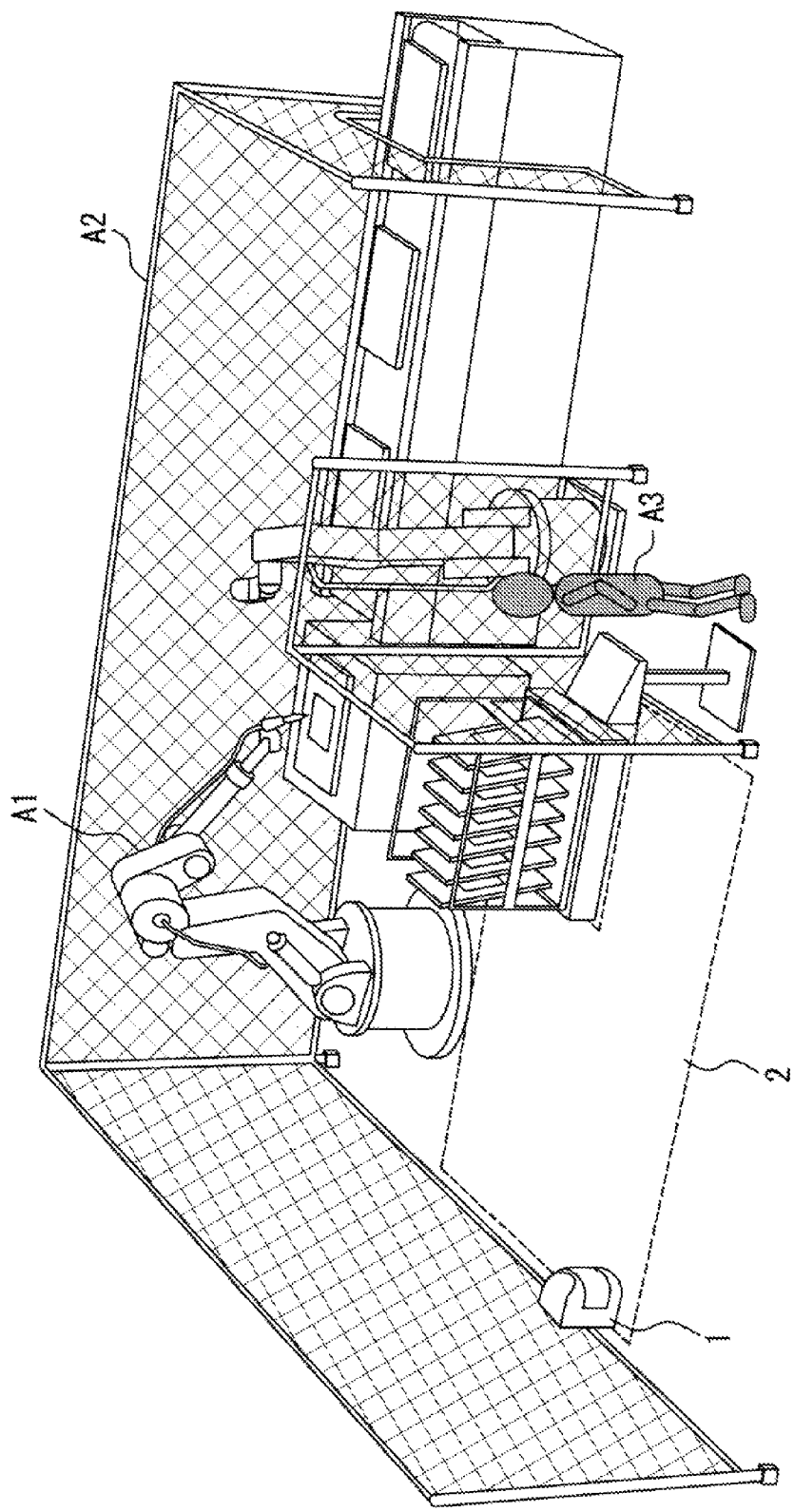
FIG. 1 is a perspective view illustrating one configurational example of a sensing system including an area monitoring sensor, in which a light scanning safety sensor 1 as one example of the area monitoring sensor is shown.

FIG. 1 is a perspective view illustrating one configurational example of a sensing system including an area monitoring sensor, in which a light scanning safety sensor 1 as one example of the area monitoring sensor is shown. In the sensing system, machines such as a carrier machine and a machining robot A1 are placed within an area that is partitioned by a safety barrier A2, an area around machinery and equipment such as a work area of the robot is set as a safety area 2, and an intruder within the safety area 2 is sensed by the safety sensor 1. In other words, the safety area 2 is a monitor area that is monitored by the safety sensor 1.

The safety sensor 1 monitors the safety area 2 having a complex shape by scanning detection light over the area, senses presence of an intruder such as an operator A3 who operates a control panel of the machinery and equipment, and outputs a detection signal. The sensing of the intruder is carried out based on reflection of the detection light on the intruder by emitting the detection light in different emitting directions.

The detection signal is used, for example, as a control signal that stops the machining robot A1 working near the safety area 2. Specifically, the safety sensor 1 includes an output signal switching device (OSSD) output, and outputs an operation enable signal when no intruder is present within the safety area 2 (OSSD ON status) and an operation disable signal when any intruder is present within the safety area 2 (OSSD OFF status).

Area Editing System

Figure 2:
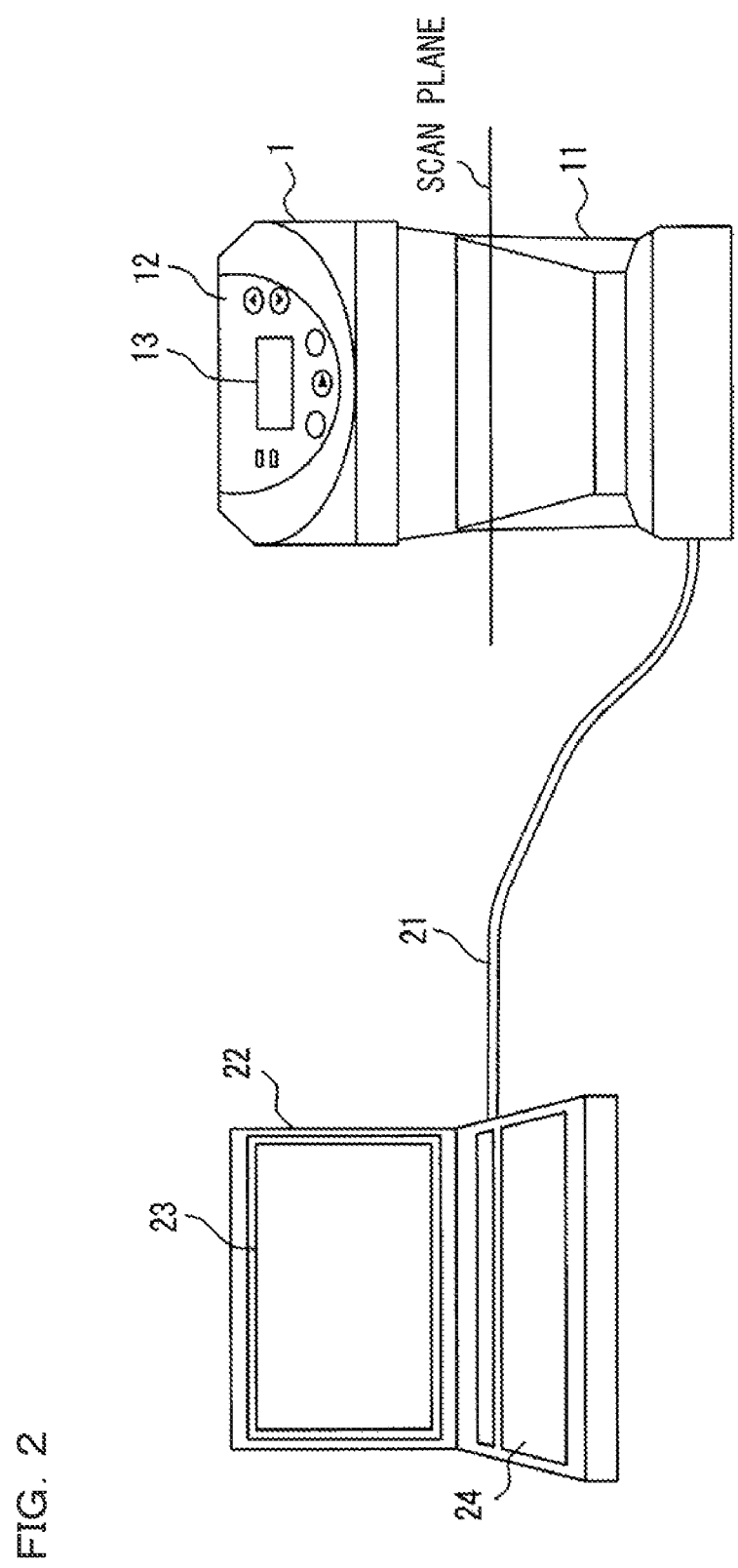
FIG. 2 is a diagram illustrating a configurational example of an area editing system including a monitor area setting device according to a first embodiment of the present invention.

FIG. 2 is a diagram illustrating a configurational example of an area editing system including a monitor area setting device according to the first embodiment of the present invention, in which a personal computer (PC) 22 in which an application program for setting the safety area is installed is shown as one example of the monitor area setting device. The PC 22 is an information processing unit provided with a display 23 and an operating unit 24, and designates an area for sensing as the safety area to the safety sensor 1, or edits the safety area that has already been set. The safety sensor 1 and the PC 22 are connected to each other via a communication cable 21.

The safety sensor 1 is a light scanning area monitoring sensor that senses an intruder within the safety area 2 by scanning the detection light across a horizontal scan plane. The safety sensor 1 is configured by, for example, a light projecting unit that projects the detection light, a scanning unit that scans the detection light in a horizontal direction repeatedly at a constant interval, a light receiving unit that receives the detection light reflected on the intruder, and a sensing unit that outputs the detection signal based on a result of the reception of the detection light.

As the detection light, for example, a laser beam of a wavelength in an infrared range is used. The safety area 2 that is a horizontal plane is monitored by scanning the detection light in the horizontal direction, and the intruder within the safety area 2 is sensed by the reception of the reflected light from the intruder.

Specifically, a distance between the safety sensor 1 and the intruder is calculated based on a light projecting timing of the detection light and a light receiving timing of the detection light reflected on the intruder. Further, a direction of the intruder is calculated by determining the emitting direction of the detection light based on the control signal of the scanning unit. Then, it is determined whether or not the intruder is present within the safety area 2 based on the calculated distance and direction, and the detection signal is outputted based on a result of the determination.

The safety sensor 1 includes a cover 11 that covers the light projecting unit, the scanning unit, the light receiving unit, and the like, and an operation panel 12. The operation panel 12 is provided with operation keys for directly specifying the safety area and a display unit 13 for displaying setting contents.

The PC 22 carries out operations such as designation of the safety area to the safety sensor 1, and editing of the safety area that has already been set.

Monitor Area Setting Device

Figure 3:
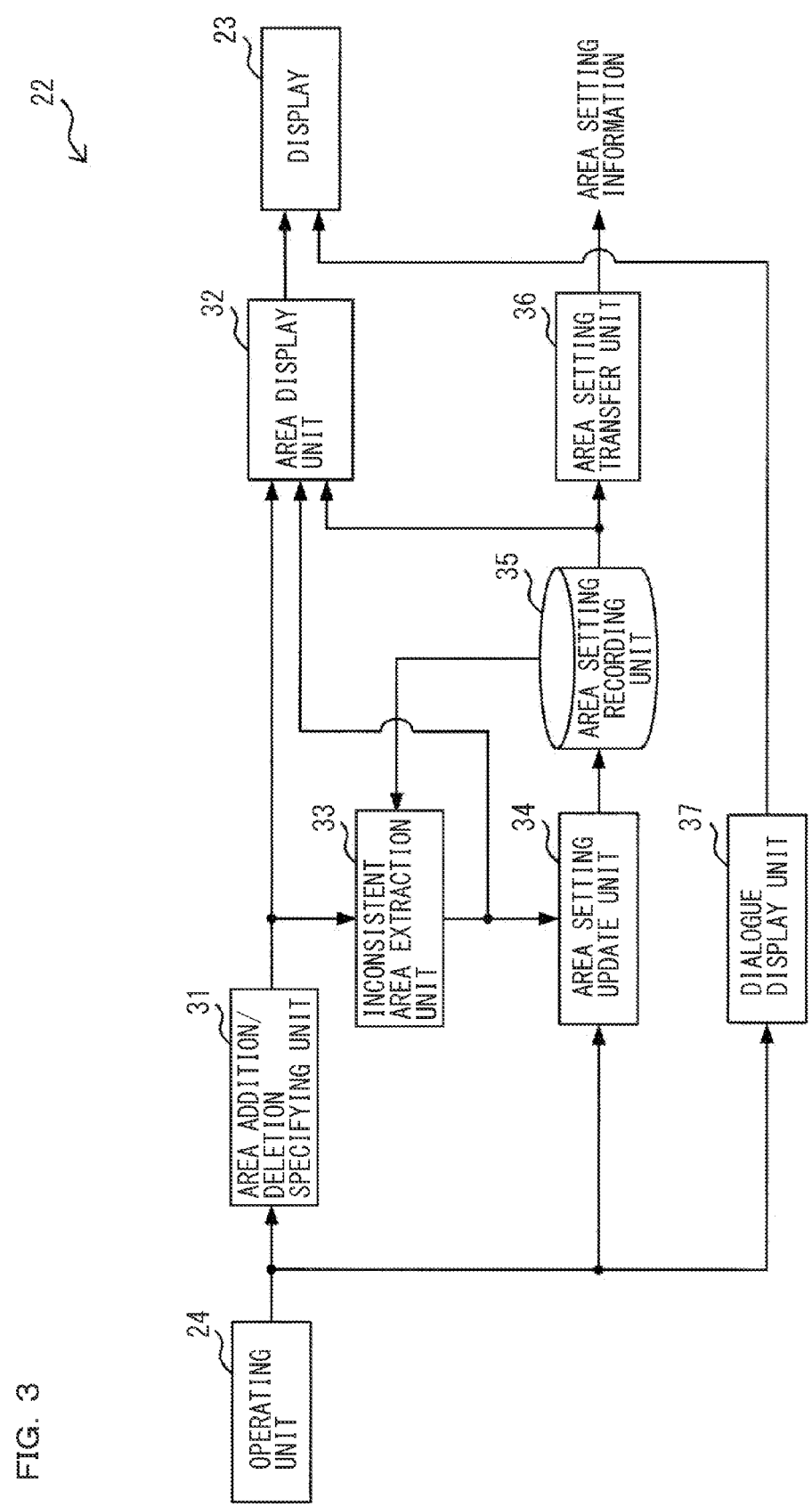
FIG. 3 is a block diagram illustrating a configurational example of a PC 22 in the area editing system shown in FIG. 2, in which one example of a functional configuration as the monitor area setting device is shown.

FIG. 3 is a block diagram illustrating a configurational example of the PC 22 in the area editing system shown in FIG. 2, in which one example of a functional configuration as the monitor area setting device is shown. The PC 22 is provided with, in addition to the display 23 and the operating unit 24, an area addition/deletion specifying unit 31, an area display unit 32, an inconsistent area extraction unit 33, an area setting update unit 34, an area setting recording unit 35, an area setting transfer unit 36, and a dialogue display unit 37.

The area setting recording unit 35 is a memory that stores area setting information for designating the safety area 2 to the safety sensor 1. The area addition/deletion specifying unit 31 specifies an area to be added or deleted and a line based on an input signal from the operating unit 24.

When adding an area to the safety area that has already been set, an area specified by a user is specified as the area to be added. Further, when deleting an area from the safety area that has already been set, an area specified by the user is specified as the area to be deleted.

The inconsistent area extraction unit 33 automatically extracts, as an inconsistent area, an area between the safety area and the area to be added with respect to the safety sensor 1. Specifically, if there is an area that is not specified as the area for sensing between the safety area and the area specified as the area to be added with respect to the safety sensor 1, this area is extracted as the inconsistent area.

When a line is specified in the area addition, the inconsistent area extraction unit 33 extracts an area between the safety area and the line with respect to the safety sensor 1, as the inconsistent area. Herein, the inconsistent area extracted in the area addition is referred to as an interpolation area.

Further, the inconsistent area extraction unit 33 automatically extracts, as the inconsistent area, an area within the safety area and on a backward side of the area to be deleted with respect to the safety sensor 1. Specifically, if there is an area that is specified as the area for sensing on a backward side of the area to be deleted with respect to the safety sensor 1, this area is extracted as the inconsistent area.

When a line is specified in the area deletion, the inconsistent area extraction unit 33 extracts an area within the safety area and on a backward side of the line with respect to the safety sensor 1, as the inconsistent area. Herein, the inconsistent area extracted in the area deletion is referred to as a shadow area.

The area display unit 32 controls the display 23, and distinguishably displays the safety area, the area to be added, the area to be deleted, and the inconsistent area (interpolation area and shadow area) based on the area setting information in the area setting recording unit 35. Specifically, when adding an area to the safety area that has already been set, the interpolation area is displayed so as to be distinguishable from the safety area and the area to be added. In this case, the interpolation area is displayed so as to be distinguishable from the safety area prior to the addition of the area to be added and the interpolation area.

Further, when deleting an area from the safety area that has already been set, the shadow area is displayed so as to be distinguishable from the safety area and the area to be deleted. In this case, the shadow area is displayed so as to be distinguishable from the safety area prior to the deletion of the area to be deleted and the shadow area.

The area setting update unit 34 updates the area setting information in the area setting recording unit 35 based on an input signal from the operating unit 24. Specifically, when adding an area to the safety area that has already been set, the area setting information is updated so that an area including the area to be added and the interpolation area is set as a new safety area.

When a line is specified in the area addition, the area setting information is updated so that an area in which the interpolation area is added to the safety area is set as a new safety area.

Further, when deleting an area from the safety area that has already been set, the area setting information is updated so that an area in which the area to be deleted and the shadow area are removed from the safety area is set as a new safety area.

When a line is specified in the area deletion, the area setting information is updated so that an area in which the shadow area is removed from the safety area is set as a new safety area.

The dialogue display unit 37 controls the display 23, and displays a confirmation dialogue based on an input signal from the operating unit 24. Specifically, when adding an area to the safety area that has already been set, an inquiry dialogue for inquiring whether or not the area to be added and the interpolation area are to be added to the safety area is displayed as the confirmation dialogue.

Further, when deleting an area from the safety area that has already been set, an inquiry dialogue for inquiring whether or not the area to be deleted and the shadow area are to be deleted from the safety area is displayed as the confirmation dialogue.

The area setting update unit 34 updates the area setting information within the area setting recording unit 35 based on the input signal from the operating unit 24, that is, an operation input to allow modification by the user, after displaying the inquiry dialogue.

The area setting transfer unit 36 transfers the area setting information in the area setting recording unit 35 to the safety sensor 1.

Area Setting Screen

Figure 4:
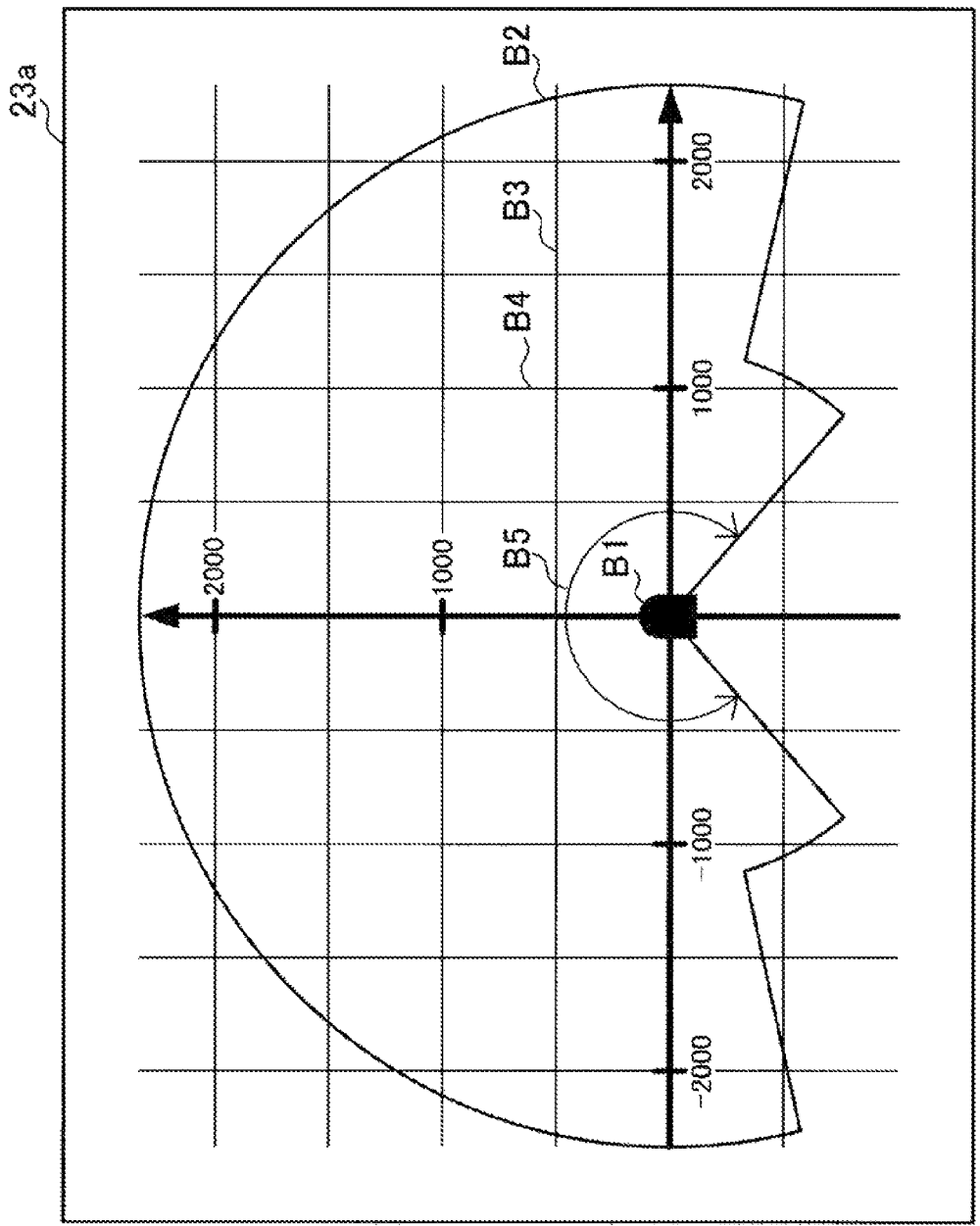
FIG. 4 is a diagram illustrating one example of an operation of the PC 22 shown in FIG. 3, in which an area setting screen 23a displayed on a display 23 is shown.

FIG. 4 is a diagram illustrating one example of an operation of the PC 22 shown in FIG. 3, in which an area setting screen 23a displayed on the display 23 is shown. The area setting screen 23a is an input screen used for newly specifying the safety area, or for editing the safety area that has already been set.

In this example, a maximum sensing area B2 is shown in Cartesian coordinates centering a symbol B1 representing the safety sensor 1. Further, grid lines B3 parallel to a transverse axis are provided at an interval of 500 mm, and grid lines B4 parallel to a longitudinal axis are provided at an interval of 500 mm.

The maximum sensing area B2 is an area that is limited by a range of distance in which the safety sensor 1 can sense. The maximum sensing area B2 is in a shape of a semicircle or a circle centering the symbol B1 on a forward side of the symbol B1.

On the other hand, on a backward side of the symbol B1, the limit of the range of the sensible distance changes according to an output angle of the detection light, and decreases as the output angle to the transverse axis increases. Here, a sensible angle range B5 is approximately not less than −45 degrees and not more than 225 degrees. Such an area outside the maximum sensing area B2 is an insensible area of the safety sensor 1, and cannot be specified as an area for sensing.

Figure 5:
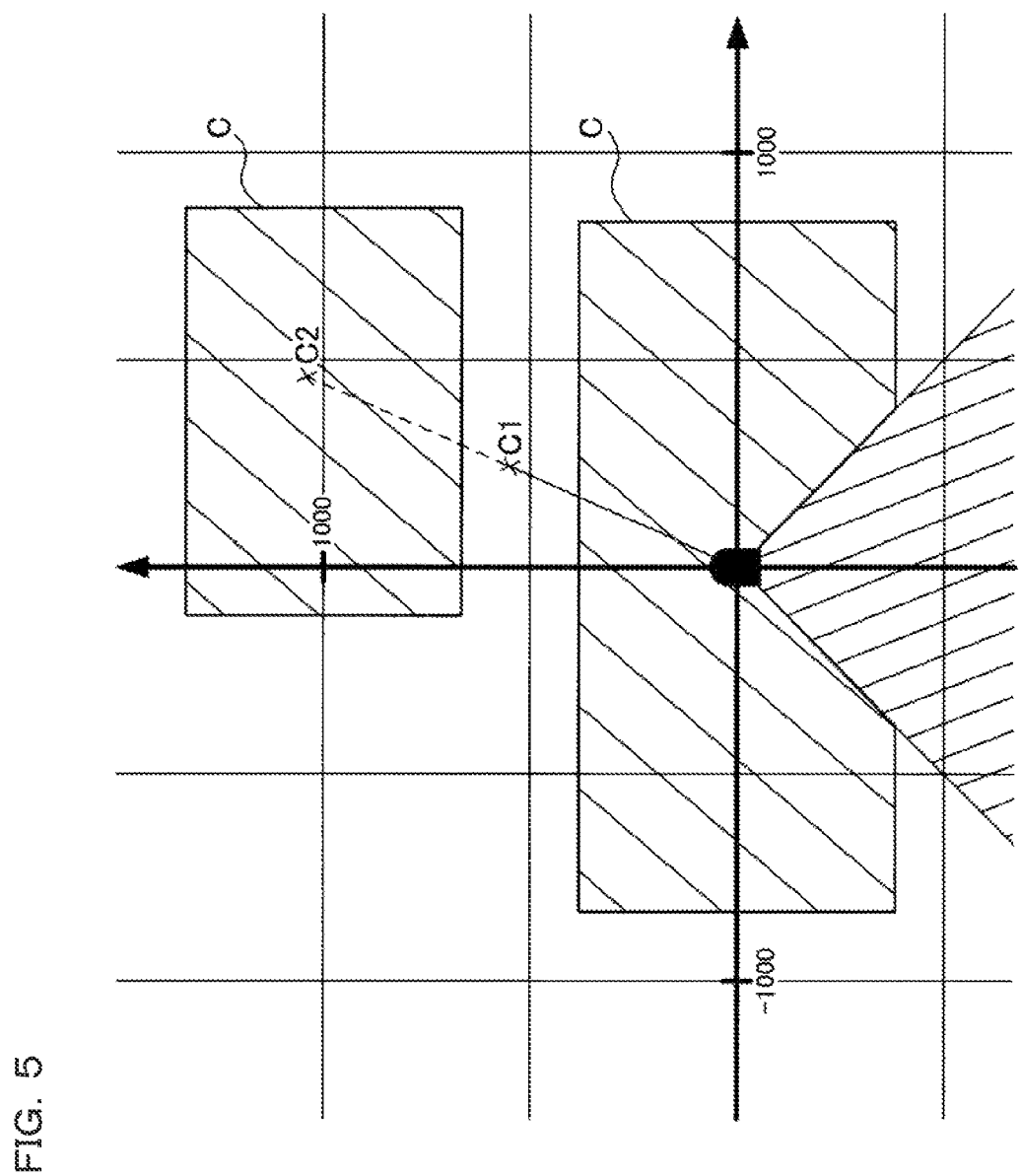
FIG. 5 is a diagram illustrating one example of the operation of the PC 22 shown in FIG. 3, in which one example of an area C that cannot be set as a safety area is shown.

FIG. 5 is a diagram illustrating one example of the operation of the PC 22 shown in FIG. 3, in which one example of an area C that cannot be set as a safety area is shown. In a case of a typical safety sensor that senses an intruder by receiving light reflected on the intruder when projecting the detection light, an area that is on a forward side of the area for sensing cannot be set as a non-sensing area. Similarly, an area that is on a backward side of the non-sensing area cannot be set as an area for sensing. In other words, an area that is discontinuous with respect to the sensor or an area that is distant from the sensor cannot be specified as the safety area.

This is because only one threshold value for determining whether or not the intruder is present in the area for sensing can be held for one light axis when scanning the detection light. Specifically, this is due to the characteristics of the sensor that the safety sensor 1 can only be set so as to, given that the threshold value is A mm, determine that the intruder is present within the area for sensing if the distance between the sensor and the intruder is not more than A mm, and determine that the intruder is not present within the area for sensing if the distance between the sensor and the intruder is more than A mm.

As a result, the area C that includes two closed areas present at locations distant from each other cannot be specified as the safety area, because the area that is on a backward side of the non-sensing area is the area for sensing. Specifically, on one light axis, a point C2 that is on a backward side of a point C1 that is outside the area C is within the area C, and it cannot be sensed if an intruder is present at the point C1 because the sensor cannot see an intruder present at the point C2.

It is not easy to add and delete an area to and from the safety area taking such characteristics of the safety sensor into account to set an area having a complex shape as the safety area. However, the monitor area setting device according to the present embodiment, when the user arbitrarily specifies the area to be added, automatically extracts, as the interpolation area, an area between the safety area and the area to be added with respect to the safety sensor, and updates the area setting information after adding the area to be added and interpolation area the to the safety area. Accordingly, it is possible to set an area having a complex shape as the safety area without full knowledge of the characteristics of the safety sensor.

Further, when the user arbitrarily specifies the area to be deleted, the monitor area setting device according to the present embodiment automatically extracts, as the shadow area, an area on the backward side of the area to be deleted with respect to the safety sensor, and updates the area setting information after removing the area to be deleted and the shadow area from the safety area. Accordingly, it is possible to set an area having a complex shape as the safety area without full knowledge of the characteristics of the safety sensor.

Addition of Area

Figure 6:
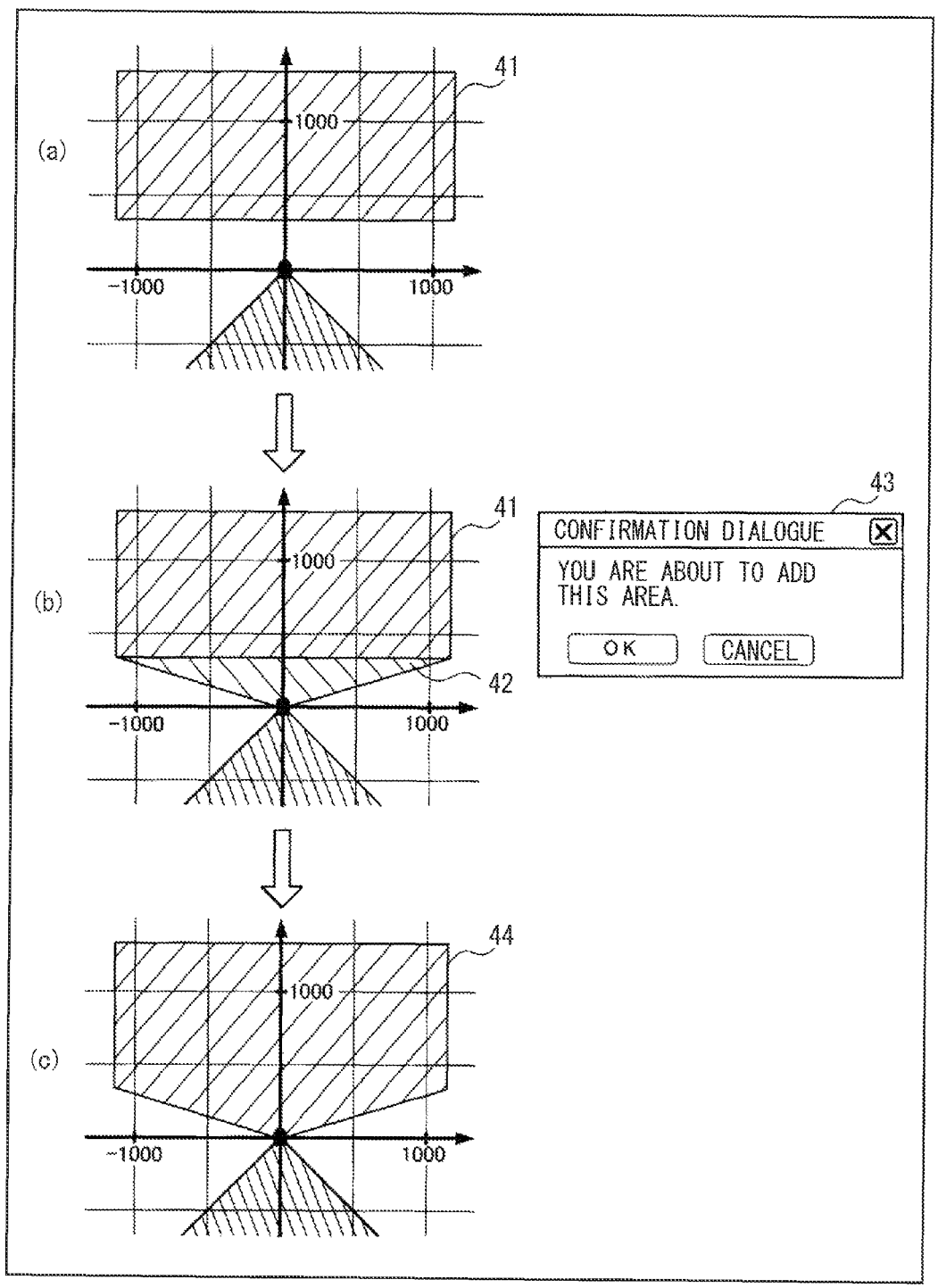
FIGS. 6A to 6C are diagrams illustrating one example of the operation of the PC 22 shown in FIG. 3, in which a case where a rectangular area 41 that is present at a distant location from the sensor is added to the safety area is shown.

FIGS. 6A to 6C are diagrams illustrating one example of the operation of the PC 22 shown in FIG. 3, in which a case where a rectangular area 41 that is present at a distant location from the sensor is added to the safety area is shown. The area for sensing can be arbitrarily set regardless of the characteristics of the sensor. Accordingly, even an area present at a distant location from the sensor can be specified as the area for sensing. In FIG. 6A, the area 41 that is specified as the area to be added by the user is shown.

As the area for sensing, in addition to the rectangular shape, a polygonal shape or a circular or semicircular shape centering the sensor can be specified. Further, it is possible to specify a closed area defined by a curved line drawn by moving a mouse pointer on the screen as the area for sensing.

On the PC 22, the area 41 is specified in the area setting screen 23a, the area 41 is set as the area to be added, for example, when the user operate a determination key, and the area to be added is determined.

At this time, when adding the area 41 to the safety area, an area which must at least be added to set the area 41 as the area for sensing is automatically extracted as an interpolation area 42. Specifically, the interpolation area 42 is extracted as an area that is not specified as the area for sensing and that is between the safety area and the area 41 specified as the area to be added with respect to the safety sensor 1.

The interpolation area 42 is displayed so as to be distinguishable from the original safety area and the area to be added. For example, the interpolation area 42 is displayed in a different color from the original safety area and the area to be added. Alternatively, the interpolation area 42 is displayed with a different shade or hatching from the original safety area and the area to be added.

Further, when the interpolation area 42 is automatically extracted, a confirmation dialogue 43 for inquiring whether or not the interpolation area 42 may be added to the safety area is displayed. In FIG. 6B, the interpolation area 42 that has been automatically extracted and the confirmation dialogue 43 are shown.

Upon an approval of the user for the modification of the safety area after the display of the confirmation dialogue 43, the area setting information is updated by setting an area in which the area to be added and the interpolation area 42 are added to the original safety area as a new safety area 44. In FIG. 6C, the safety area 44 in which the interpolation area 42 is added is shown.

When the modification of the safety area is not approved, the area setting information is not updated and the operation returns to an input mode of the area to be added.

Deletion of Area

Figure 7:
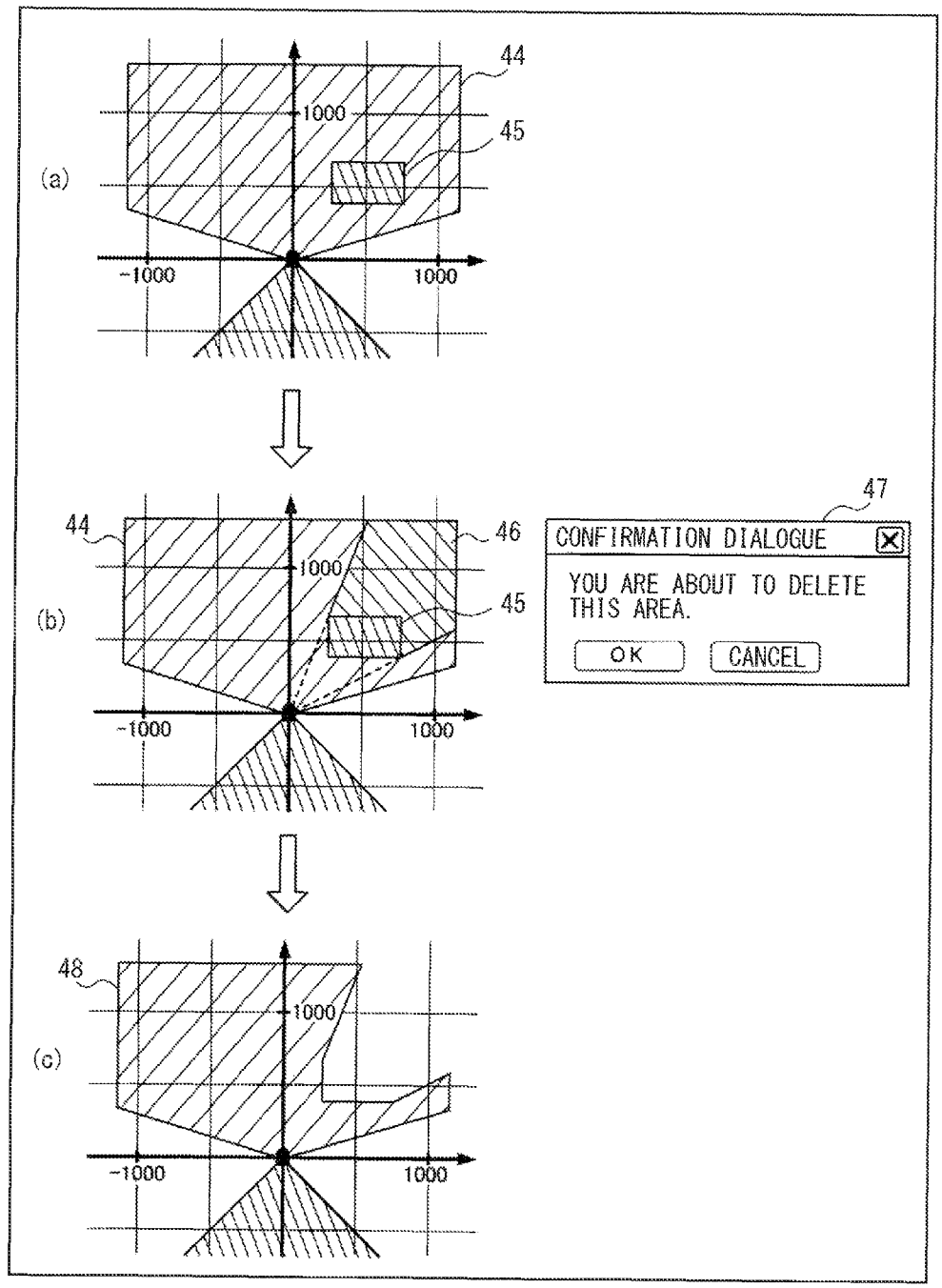
FIGS. 7A to 7C are diagrams illustrating one example of the operation of the PC 22 shown in FIG. 3, in which a case where a rectangular area 45 within a safety area 44 is deleted from the safety area 44 is shown.

FIGS. 7A to 7C are diagrams illustrating one example of the operation of the PC 22 shown in FIG. 3, in which a case where a rectangular area 45 within the safety area 44 is deleted from the safety area 44 is shown. An area to be deleted from the safety area 44 can be arbitrarily specified. In FIG. 7A, the area 45 that is specified as the area to be deleted by the user is shown.

As the area to be deleted, in addition to the rectangular shape, a polygonal shape or a circular or semicircular shape centering the sensor can be specified. Further, it is possible to specify a closed area defined by a curved line drawn by moving a mouse pointer on the screen as the area for sensing.

On the PC 22, the area 45 is specified in the area setting screen 23a, the area 45 is set as the area to be deleted, for example, when the user operate a determination key, and the area to be deleted is determined.

At this time, when deleting the area 45 from the safety area 44, an area which must at least be removed to set the area 45 as the non-sensing area is automatically extracted as a shadow area 46. Specifically, an area that is the area for sensing on the backward side of the area 45 specified as the area to be deleted with respect to the safety sensor 1 is extracted as the shadow area 46.

The shadow area 46 is displayed so as to be distinguishable from the safety area 44 and the area to be deleted. For example, the shadow area 46 is displayed in a different color from the safety area 44 and the area to be deleted. Alternatively, the shadow area 46 is displayed with a different shade or hatching from the safety area 44 and the area to be deleted.

Further, when the shadow area 46 is automatically extracted, a confirmation dialogue 47 for inquiring whether or not the shadow area 46 may be removed is displayed. In FIG. 7B, the shadow area 46 that has been automatically extracted and the confirmation dialogue 47 are shown.

Upon an approval of the user for the modification of the safety area after the display of the confirmation dialogue 47, the area setting information is updated by setting an area excluding the area to be deleted and the shadow area 46 from the safety area 44 as a new safety area 48. In FIG. 7C, the safety area 48 in which the shadow area 46 has been removed is shown.

When the modification of the safety area is not approved, the area setting information is not updated and the operation returns to the input mode of the area to be deleted.

Figure 8:
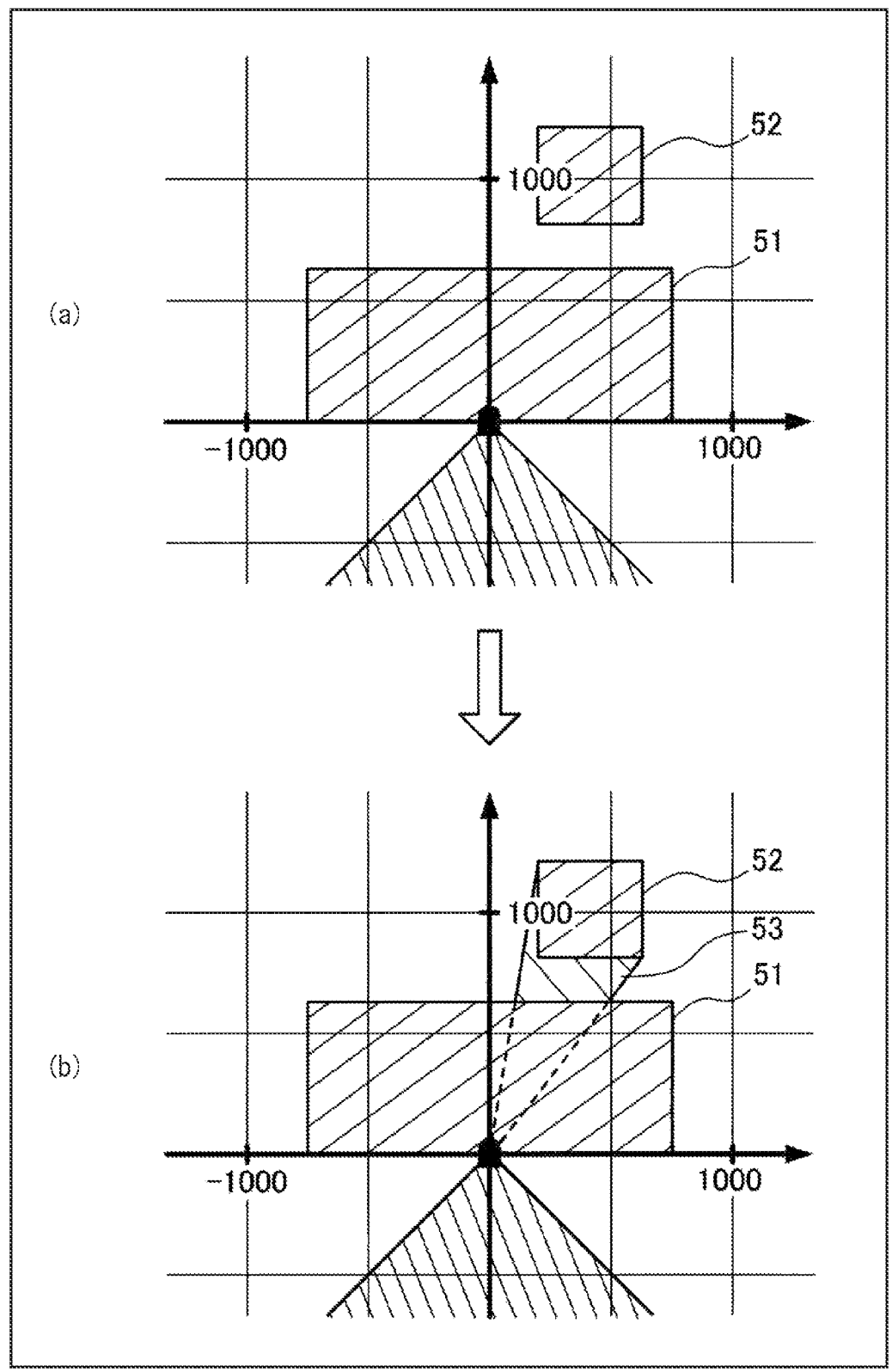
FIGS. 8A and 8B are diagrams illustrating another example of the operation of adding an area of the PC 22 shown in FIG. 3, in which a case where an area 52 that is present at a distant location from a safety area 51 is added to the safety area 51 is shown.

FIGS. 8A and 8B are diagrams illustrating another example of the operation of adding an area of the PC 22 shown in FIG. 3, in which a case where a rectangular area 52 that is present at a distant location from a safety area 51 is added to the safety area 51 is shown. The safety area 51 is a rectangular area provided with a sensor at a center of a long side thereof, and the area 52 is located at a position farther than the safety area 51 with respect to the sensor. In FIG. 8A, the area 52 specified as the area to be added by the user is shown.

When the area 52 as described above is specified as the area to be added, an area which must at least be added to set the area 52 as the area for sensing is extracted as an interpolation area 53. Specifically, the interpolation area 53 is extracted as an area that is not specified as the area for sensing and that is between the safety area 51 and the area 52 specified as the area to be added with respect to the safety sensor 1. In FIG. 8B, the interpolation area 53 that has been automatically extracted is shown.

Then, when the modification of the safety area is approved by the user, the area setting information is updated by setting an area in which the area to be added and the interpolation area 53 are added to the safety area 51 as a new safety area.

Figure 9:
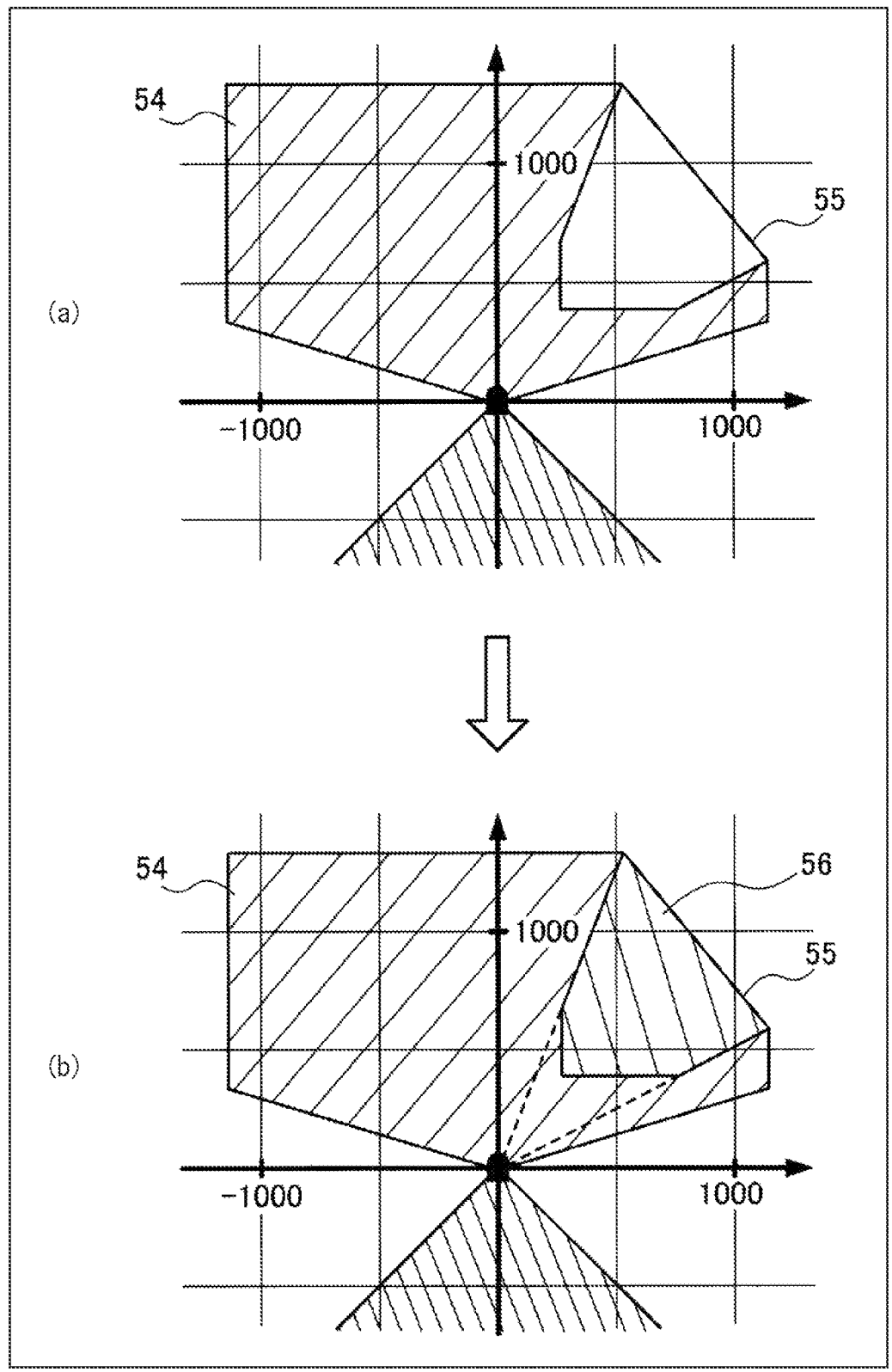
FIGS. 9A and 9B are diagrams illustrating another example of the operation of adding an area of the PC 22 shown in FIG. 3, in which a case where a line 55 is specified when adding an area is shown.

FIGS. 9A and 9B are diagrams illustrating another example of the operation of adding an area of the PC 22 shown in FIG. 3, in which a case where a line 55 is specified when adding an area. A safety area 54 is in a polygonal shape with the sensor positioned at one of its vertices, and a portion disposed in a first quadrant is recessed toward the sensor. The line 55 is disposed so as to block the recessed portion. In FIG. 9A, the line 55 specified by the user during the area addition is shown.

When the line 55 as described above is specified during the area addition, an area which must at least be added to set the line 55 as the area for sensing is extracted as an interpolation area 56. Specifically, the interpolation area 56 is extracted as an area that is not specified as the area for sensing and that is between the safety area 54 and the line 55 specified during the area addition with respect to the safety sensor 1. In FIG. 9B, the interpolation area 56 that has been automatically extracted is shown.

Then, when the modification of the safety area is approved by the user, the area setting information is updated by setting an area in which the area to be added and the interpolation area 56 are added to the safety area 54 as a new safety area.

Figure 10:
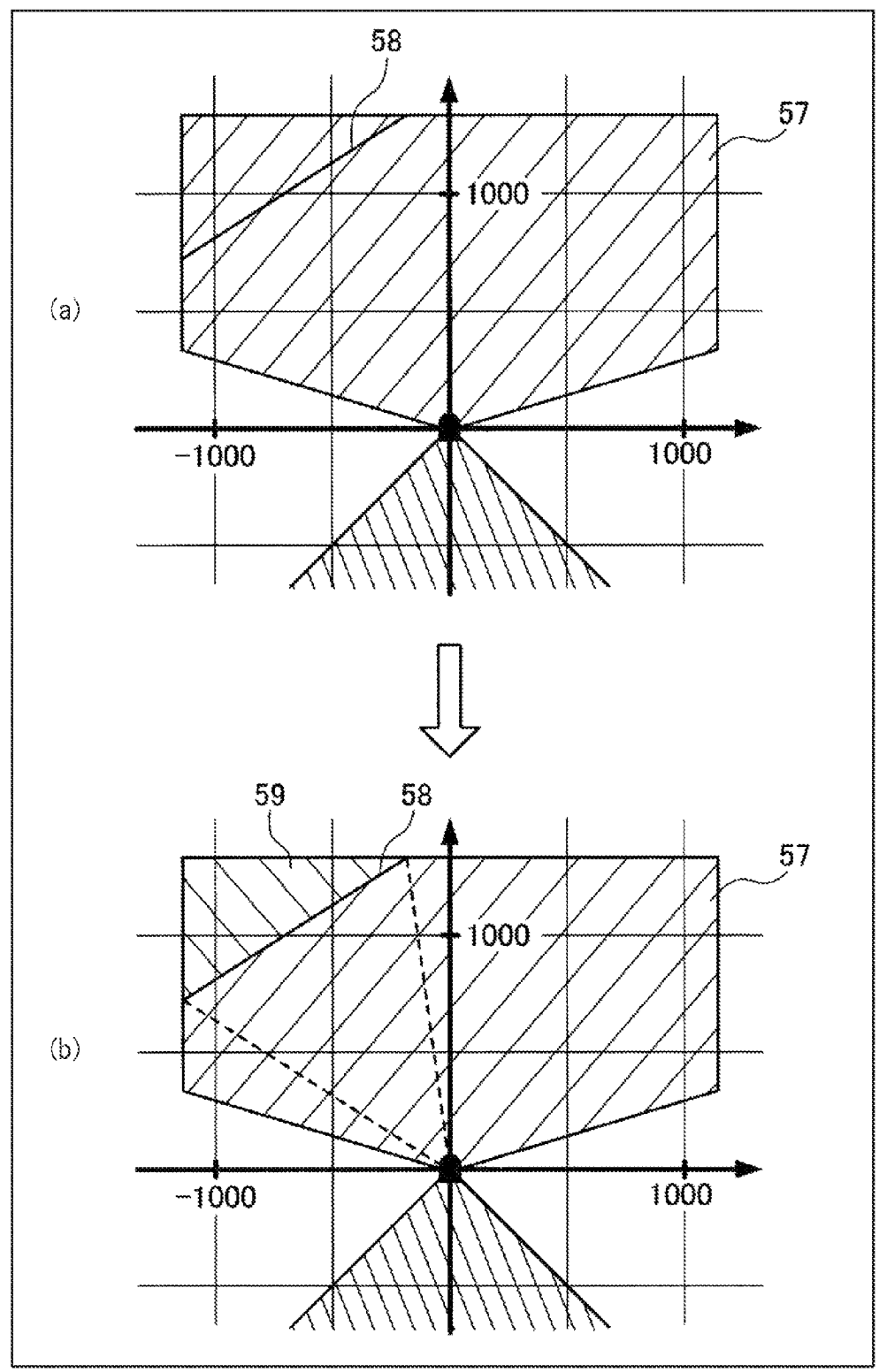
FIGS. 10A and 10B are diagrams illustrating another example of an operation of deleting an area of the PC 22 shown in FIG. 3, in which a case where a line 58 is specified when deleting an area is shown.

FIGS. 10A and 10B are diagrams illustrating another example of an operation of deleting an area of the PC 22 shown in FIG. 3, in which a case where a line 58 is specified when deleting an area. A safety area 57 is in a polygonal shape with the sensor positioned at one of its vertices. The line 58 is disposed so as to cut out a portion around the vertex in a second quadrant in the safety area 57. In FIG. 10A, the line 58 specified by the user during the area deletion is shown.

When the line 58 as described above is specified during the area deletion, an area which must at least be removed to set the line 58 as the non-sensing area is extracted as a shadow area 59. Specifically, an area that is the area for sensing on the backward side of the line 58 specified during the area deletion with respect to the safety sensor 1 is extracted as the shadow area 59. In FIG. 10B, the shadow area 59 that has been automatically extracted is shown.

Then, when the modification of the safety area is approved by the user, the area setting information is updated by setting an area excluding the area to be deleted and the shadow area 59 from the safety area 57 as a new safety area.

Figure 11:
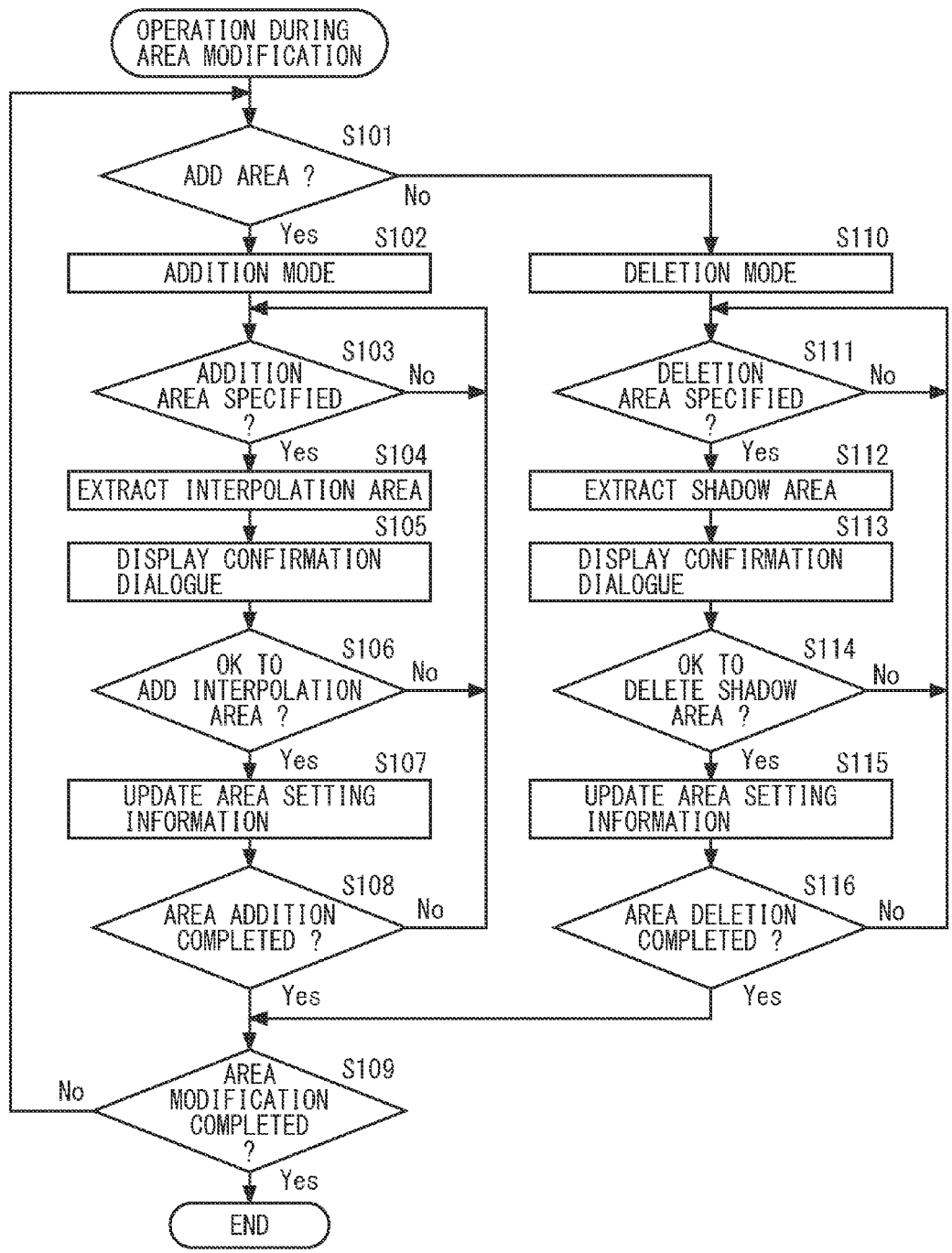
FIG. 11 is a flowchart illustrating one example of an operation of editing an area in the PC 22 shown in FIG. 3.

Steps S101 to S116 in FIG. 11 is a flowchart illustrating one example of an operation of editing an area in the PC 22 shown in FIG. 3. First, when the user selects the area addition during the modification of the safety area, the area addition/deletion specifying unit 31 moves to the area addition mode (steps S101, S102).

Next, when the area to be added to the safety area is specified by the user and an operation of the determination is carried out during the addition mode, the area addition/deletion specifying unit 31 determines the area to be added (step S103).

At this time, the inconsistent area extraction unit 33 extracts the interpolation area as an area which must at least be added to set the area to be added as the area for sensing, based on the safety area and the area to be added specified by the area addition/deletion specifying unit 31 (step S104).

Next, the dialogue display unit 37 displays a confirmation dialogue for inquiring whether or not the interpolation area may be added to the safety area (step S105). Upon an approval of the user for the addition of the interpolation area after the display of the confirmation dialogue (step S106), the area setting update unit 34 updates the area setting information in the area setting recording unit 35 (step S107).

When the addition of the interpolation area is not approved, the procedures from step S103 to step S105 are repeated. Further, the procedures from step S103 to step S107 are repeated until the area addition mode ends (step S108).

On the other hand, when the area deletion is selected during the modification of the safety area, the area addition/deletion specifying unit 31 moves to the area deletion mode (steps S101, S110).

Next, when the area to be deleted from the safety area is specified by the user and an operation of the determination is carried out during the deletion mode, the area addition/deletion specifying unit 31 determines the area to be deleted (step S111).

At this time, the inconsistent area extraction unit 33 extracts the shadow area as an area which must at least be removed to set the area to be deleted as the non-sensing area, based on the safety area and the area to be deleted specified by the area addition/deletion specifying unit 31 (step S112).

Next, the dialogue display unit 37 displays a confirmation dialogue for inquiring whether or not the shadow area may be removed from the safety area (step S113). Upon an approval of the user for the removal of the shadow area after the display of the confirmation dialogue (step S114), the area setting update unit 34 updates the area setting information in the area setting recording unit 35 (step S115).

When the removal of the shadow area is not approved, the procedures from step S111 to step S113 are repeated. Further, the procedures from step S111 to step S115 are repeated until the area deletion mode ends (step S116).

After the addition mode or the deletion mode ends, step S101 and the subsequent procedures are repeated until the editing of the area ends (step s109).

According to the present embodiment, when the user specifies the area to be added, the interpolation area is automatically extracted as an inconsistent area and the area setting information is updated. Accordingly, it is possible to easily add a desired area without full knowledge of the characteristics of the safety sensor. In particular, even an area that is present at a distant location from the safety area that has already been set can be easily added. Further, when the user specifies the area to be deleted, the shadow area is automatically extracted as an inconsistent area and the area setting information is updated. Accordingly, it is possible to easily delete a desired area without full knowledge of the characteristics of the safety sensor. In particular, even an area that is present within the safety area that has already been set but distant from a periphery portion of the safety area can be easily deleted.

Further, because the area for sensing that is newly generated by setting the area to be added as the area for sensing is extracted as the interpolation area and displayed distinguishably from the other areas, it is possible to improve the convenience during editing the safety area. In addition, because the non-sensing area that is newly generated by setting the area to be deleted as the non-sensing area is extracted as the shadow area and displayed distinguishably from the other areas, it is possible to improve the convenience during editing the safety area. For example, when attempting to specify an area of a complicated and indented shape as the monitor area, by repeating the specification of the area to be added and the area to be deleted alternately, it is possible for the user to recognize easily if such an area can be specified as the monitor area. Specifically, even when areas that the user wishes to set as the monitor area and areas that the user does not wish to set as the monitor area are positioned in a complicated manner, by repeating the specification of the area to be added and the area to be deleted alternately, an area to be added and an area to be deleted are automatically extracted as the inconsistent area. Therefore, it is possible to easily recognize whether or not an area that the user wishes to set as the monitor area can be actually specified as the monitor area.

In the present embodiment, the example in which the area setting information is updated based on the operation of approval for the area modification by the user is described. However, the present invention is not limited thereto. For example, it is possible to improve convenience during editing the safety area by allowing the user to confirm as needed after the safety area is updated by storing information such as the safety area before modification, the area to be added and the area to be deleted that are specified by the user, and the interpolation area and the shadow area that are automatically extracted as history information.

Second Embodiment

The first embodiment described the example in which the area setting information is updated by automatically extracting the inconsistent area when the user specifies the area to be added and the area to be deleted. In contrast, the present embodiment describes a case in which a measurement error zone is displayed when the safety area is set by monitoring a sensing condition of the intruder.

Measurement Error

Figure 12:
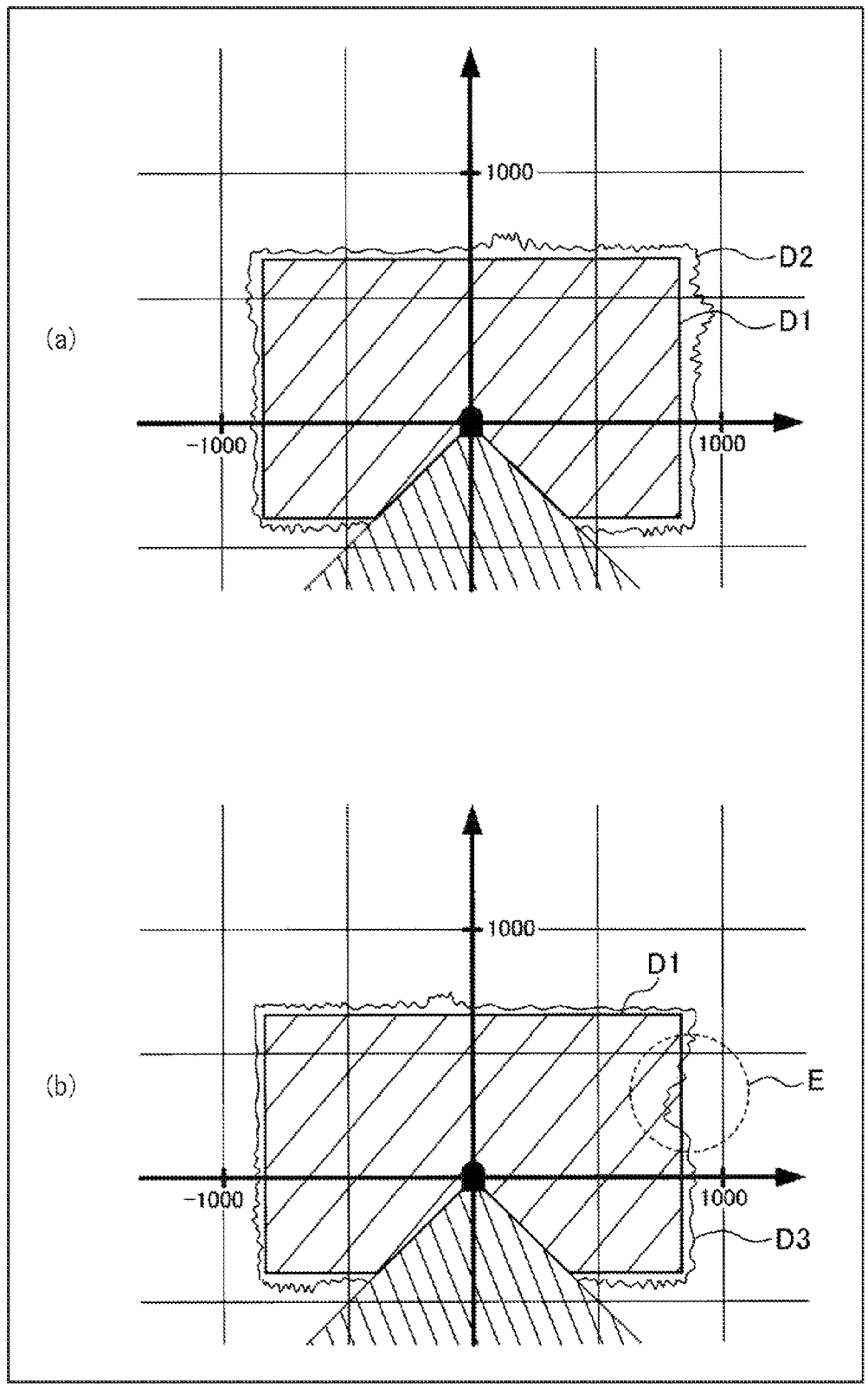
FIGS. 12A and 12B are diagrams illustrating one example of an operation of the monitor area setting device according to a second embodiment of the present invention, in which detection data D2, D3 obtained from the safety sensor 1 are shown.

FIGS. 12A and 12B are diagrams illustrating one example of an operation of the monitor area setting device according to a second embodiment of the present invention, in which detection data D2, D3 obtained from the safety sensor 1 and a safety area D1 are shown. The safety sensor 1 is configured to output a distance and a direction to a sensed intruder, every time the detection light scans, as the detection data D2. The PC 22 obtains the detection data D2 from the safety sensor 1 and displays the data on coordinates for setting the safety area, thereby allowing the user to recognize the distance and the direction to an obstacle such as a wall or a safety barrier.

FIG. 12A shows the safety area D1 that has been set based on the detection data D2 obtained at a certain point of time. When positioning the safety sensor 1 in an area enclosed by the wall or the safety barrier, it is conceivable that the safety area is set by enlarging the area for sensing close to the obstacle based on the detection data D2 that is the data sensed as the distance and the direction to the obstacle such as the wall and the safety barrier.

However, the distance and the direction to the intruder sensed by the safety sensor 1 include a measurement error. Consequently, even if the safety area D1 is set so that the obstacle such as the wall and the safety barrier may not be sensed as the intruder based on the detection data D2 obtained at a certain point of time, there can be a case in which the obstacle is sensed as the intruder within the safety area D1 due to the measurement error.

FIG. 12B shows a portion E of the detection data D3 positioned within the safety area D1. When the obstacle is sensed as the intruder within the safety area D1 due to the measurement error, an OSSD output can be erroneously turned off, thereby stopping a production line.

Display of Measurement Error Zone

In view of such a problem, in the present embodiment, an area that can include the error is displayed as a measurement error zone when setting the safety area, considering a measurement error in the distance to the intruder and a measurement error in the detection direction due to a fluctuation of the light axis for the detection data obtained from the safety sensor 1.

Specifically, (1) first, the detection data is obtained from the safety sensor 1. (2) Next, an average distance is calculated by time averaging detection values of a plurality of times of scanning for each detection direction. For example, the detection data is averaged for a time period on the order of 500 ms to 1s.

(3) Next, for each detection direction, an upper limit distance is obtained by adding a constant value to the average distance. Further, a lower limit distance is obtained by subtracting a constant value from the average distance. As the constant value, for example, a maximum of a value that can be conceived of as the measurement error of the distance (i.e., a value on the order of 100 mm) can be used.

(4) Next, in front and back of the watching direction, for example, within a range not less than −1.5 degrees and not more than +1.5 degrees, an outer bailey distance for the watching direction is calculated by extracting a maximum value of the upper limit distance. Further, an inner bailey distance for the watching direction is calculated by extracting a minimum value of the lower limit distance.

(5) Then, an area between the outer bailey and the inner bailey is shown as a measurement error zone, taking an outer bailey as a boundary line that is formed by connecting points at the outer bailey distance from the safety sensor 1, and an inner bailey as a boundary line that is formed by connecting points at the inner bailey distance from the safety sensor 1.

Figure 13:
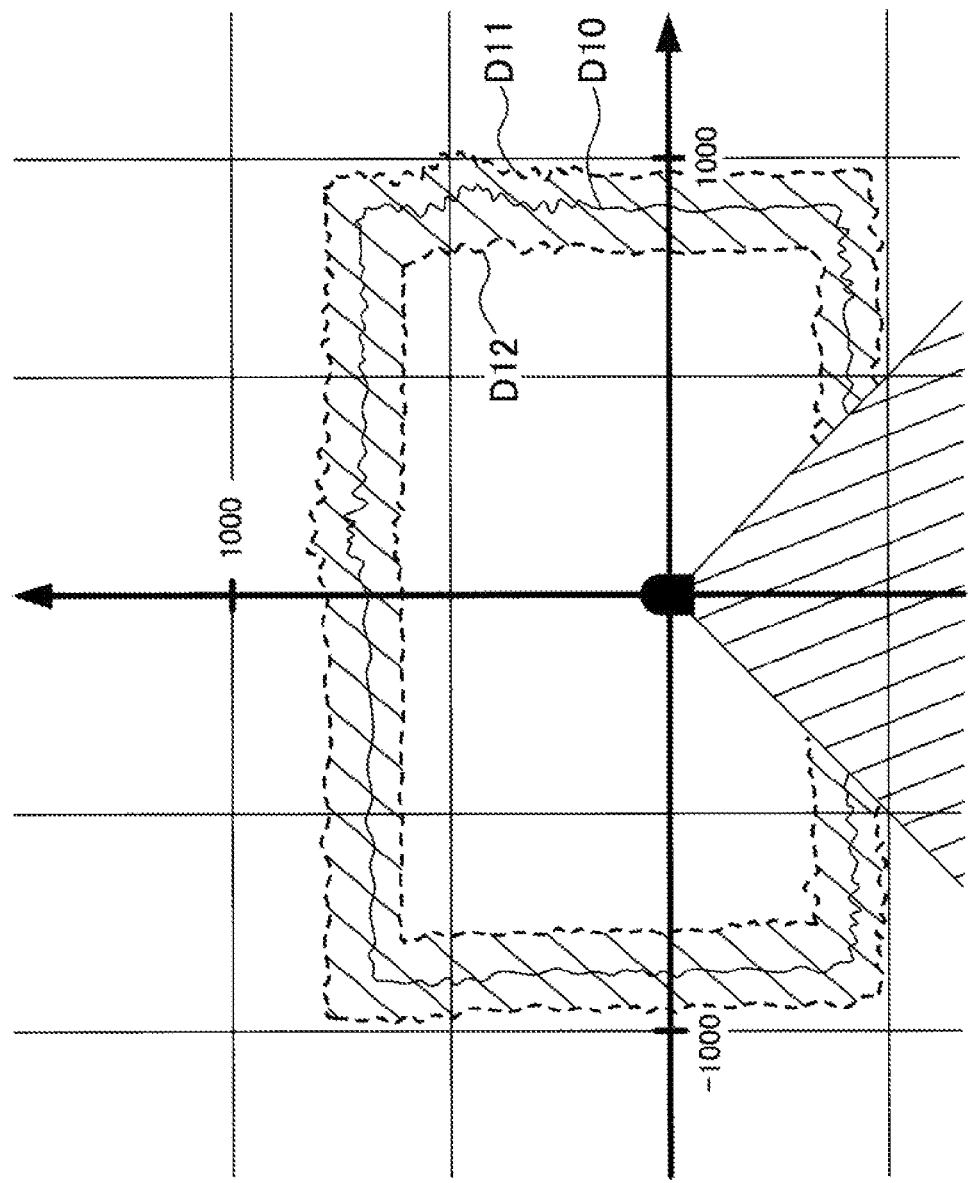
FIG. 13 is a diagram illustrating one example of the operation of the monitor area setting device according to the second embodiment of the present invention, in which a measurement error zone displayed on a plane of coordinates for the area setting is shown.

FIG. 13 is a diagram illustrating one example of the operation of the monitor area setting device according to the second embodiment of the present invention, in which a measurement error zone displayed on a plane of coordinates for setting the safety area is shown. An outer bailey D11 is a boundary line that is formed by connecting the points at the outer bailey distance from the safety sensor 1. On the other hand, an inner bailey D12 is a boundary line that is formed by connecting the points at the inner bailey distance from the safety sensor 1.

The measurement error zone is an area that can include an error when considering the measurement error of the distance and the measurement error in the detection direction due to the fluctuation of the light axis, and the measurement error zone is disposed between the outer bailey D11 and the inner bailey D12.

Here, the measurement error zone is displayed so as to be distinguishable from a boundary line D10 that is formed by connecting points at the average distance from the safety sensor 1. For example, the measurement error zone is displayed in a different color from that of the boundary line D10. Alternatively, the measurement error zone is displayed with a shade or hatching.

In the first and second embodiments, the examples in which the PC 22 installed with the program for setting the safety area as a rewritable application program is used as the monitor area setting device are described. However, the present invention is not limited thereto. For example, the present invention can be applied to a terminal device used only for setting the monitor area to set the safety area for the safety sensor.

What is claimed is:

1. A monitor area setting device that generates area setting information for designating a monitor area to an area monitoring sensor that emits detection light in different emitting directions and senses an intruder within the monitor area based on reflection of the detection light, the device comprising:
an area setting recording unit that holds the area setting information;
an addition area specifying unit that specifies an addition area based on an operation input;
an inconsistent area extracting unit that extracts an area that is between the monitor area and the addition area with respect to the area monitoring sensor as an inconsistent area; and
an area setting updating unit that updates the area setting information so as to set an area formed by adding the addition area and the inconsistent area to the monitor area as a new monitor area.

2. A monitor area setting device that generates area setting information for designating a monitor area to an area monitoring sensor that emits detection light in different emitting directions and senses an intruder within the monitor area based on reflection of the detection light, the device comprising:
an area setting recording unit that holds the area setting information;
a line specifying unit that specifies a line based on an operation input;
an inconsistent area extracting unit that extracts an area that is between the monitor area and the line with respect to the area monitoring sensor as an inconsistent area; and
an area setting updating unit that updates the area setting information so as to set an area formed by adding the inconsistent area to the monitor area as a new monitor area.

3. The monitor area setting device according to claim 1, further comprising:
an inconsistent area display unit that displays the inconsistent area; and
a dialogue display unit that displays an inquiry dialogue for inquiring whether or not the inconsistent area is to be added to the monitor area, wherein
the area setting updating unit updates the area setting information based on an operation input after the inquiry dialogue is displayed.

4. The monitor area setting device according to claim 2, further comprising:
an inconsistent area display unit that displays the inconsistent area; and
a dialogue display unit that displays an inquiry dialogue for inquiring whether or not the inconsistent area is to be added to the monitor area, wherein
the area setting updating unit updates the area setting information based on an operation input after the inquiry dialogue is displayed.

5. A monitor area setting device that generates area setting information for designating a monitor area to an area monitoring sensor that emits detection light in different emitting directions and senses an intruder within the monitor area based on reflection of the detection light, the device comprising:
an area setting recording unit that holds the area setting information;
a deletion area specifying unit that specifies a deletion area based on an operation input;
an inconsistent area extracting unit that extracts an area that is within the monitor area and on a backward side of the deletion area; and
an area setting updating unit that updates the area setting information so as to set an area formed by excluding the deletion area and the inconsistent area from the monitor area as a new monitor area.

6. A monitor area setting device that generates area setting information for designating a monitor area to an area monitoring sensor that emits detection light in different emitting directions and senses an intruder within the monitor area based on reflection of the detection light, the device comprising:
an area setting recording unit that holds the area setting information;
a line specifying unit that specifies a line based on an operation input;
an inconsistent area extracting unit that extracts an area that is within the monitor area and on a backward side of the line; and
an area setting updating unit that updates the area setting information so as to set an area formed by excluding the inconsistent area from the monitor area as a new monitor area.

7. The monitor area setting device according to claim 5, further comprising:
an inconsistent area display unit that displays the inconsistent area; and
a dialogue display unit that displays an inquiry dialogue for inquiring whether or not the inconsistent area is to be removed from the monitor area, wherein
the area setting updating unit updates the area setting information based on an operation input after the inquiry dialogue is displayed.

8. The monitor area setting device according to claim 6, further comprising:
an inconsistent area display unit that displays the inconsistent area; and
a dialogue display unit that displays an inquiry dialogue for inquiring whether or not the inconsistent area is to be removed from the monitor area, wherein
the area setting updating unit updates the area setting information based on an operation input after the inquiry dialogue is displayed.

9. The monitor area setting device according to claim 1, further comprising:
a deletion area specifying unit that specifies a deletion area based on an operation input;
an inconsistent area extracting unit that extracts an area that is within the monitor area and on a backward side of the deletion area; and
wherein the area setting updating unit that updates the area setting information so as to set an area formed by excluding the deletion area and the inconsistent area from the monitor area as a new monitor area.

10. The monitor area setting device according to claim 1, further comprising:
a line specifying unit that specifies a line based on an operation input;

an inconsistent area extracting unit that extracts an area that is within the monitor area and on a backward side of the line; and wherein the area setting updating unit that updates the area setting information so as to set an area formed by excluding the inconsistent area from the monitor area as a new monitor area.

11. The monitor area setting device according to claim 9, further comprising:

an inconsistent area display unit that displays the inconsistent area; and a dialogue display unit that displays an inquiry dialogue for inquiring whether or not the inconsistent area is to be removed from the monitor area, wherein the area setting updating unit updates the area setting information based on an operation input after the inquiry dialogue is displayed.

12. The monitor area setting device according to claim 10, further comprising:

an inconsistent area display unit that displays the inconsistent area; and a dialogue display unit that displays an inquiry dialogue for inquiring whether or not the inconsistent area is to be removed from the monitor area, wherein the area setting updating unit updates the area setting information based on an operation input after the inquiry dialogue is displayed.

13. The monitor area setting device according to claim 2, further comprising:

a deletion area specifying unit that specifies a deletion area based on an operation input;

an inconsistent area extracting unit that extracts an area that is within the monitor area and on a backward side of the deletion area; and wherein the area setting updating unit that updates the area setting information so as to set an area formed by excluding the deletion area and the inconsistent area from the monitor area as a new monitor area.

14. The monitor area setting device according to claim 2, further comprising:

an inconsistent area extracting unit that extracts an area that is within the monitor area and on a backward side of the line; and wherein the area setting updating unit that updates the area setting information so as to set an area formed by excluding the inconsistent area from the monitor area as a new monitor area.

15. The monitor area setting device according to claim 13, further comprising:

an inconsistent area display unit that displays the inconsistent area; and a dialogue display unit that displays an inquiry dialogue for inquiring whether or not the inconsistent area is to be removed from the monitor area, wherein the area setting updating unit updates the area setting information based on an operation input after the inquiry dialogue is displayed.

16. The monitor area setting device according to claim 14, further comprising:

an inconsistent area display unit that displays the inconsistent area; and a dialogue display unit that displays an inquiry dialogue for inquiring whether or not the inconsistent area is to be removed from the monitor area, wherein the area setting updating unit updates the area setting information based on an operation input after the inquiry dialogue is displayed.

* * * * *